Jan. 2, 1951 H. T. JENKINS 2,536,607
BROOM RAKE
Filed Oct. 22, 1947 2 Sheets-Sheet 2
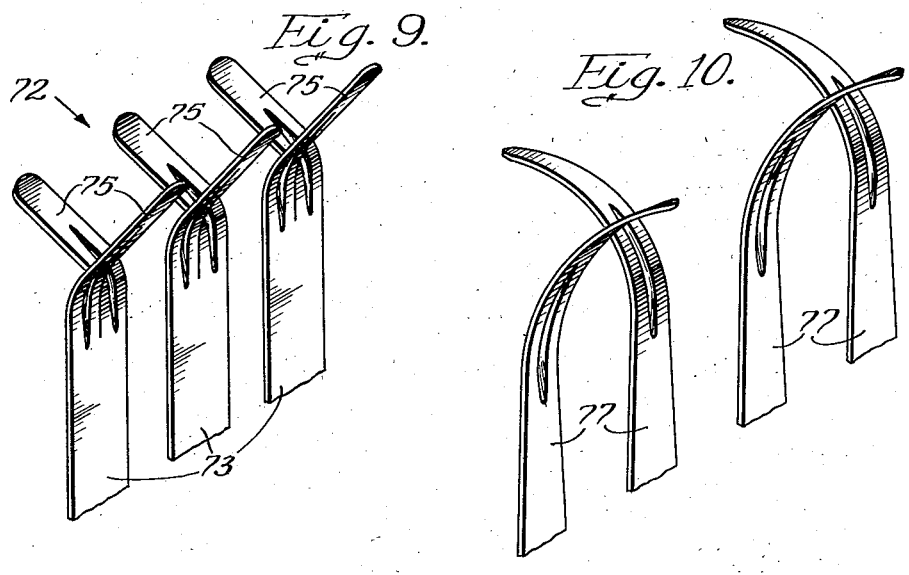
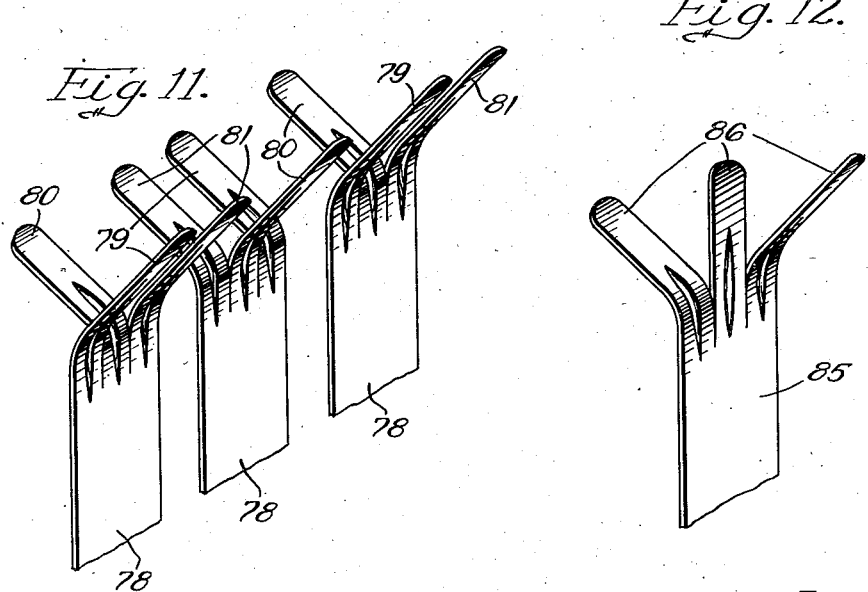
Inventor:
Homer T. Jenkins
By Brown, Jackson, Boettcher & Dienner
Attys.

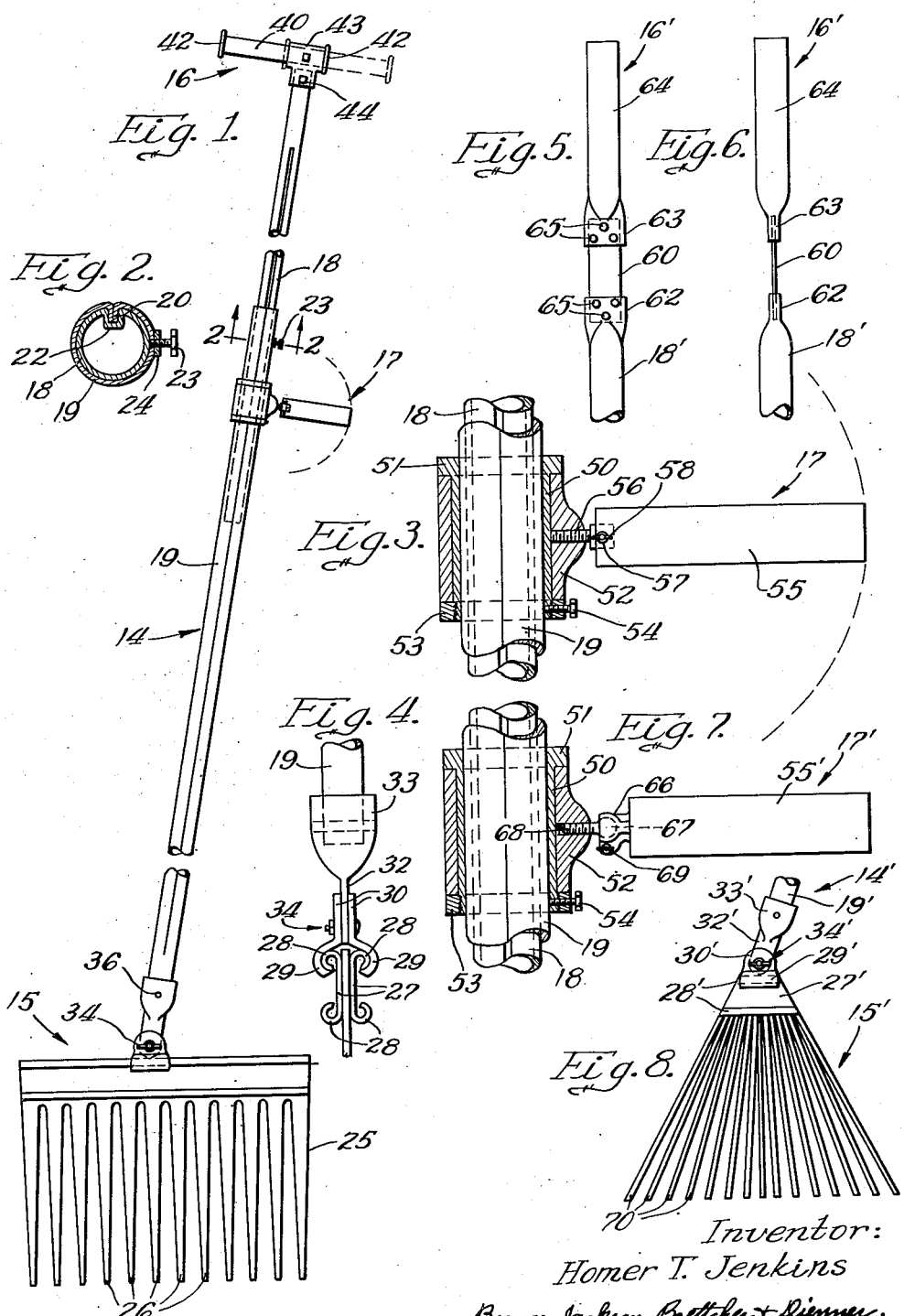

Patented Jan. 2, 1951

2,536,607

UNITED STATES PATENT OFFICE 2,536,607

BROOM RAKE

Homer T. Jenkins, Chicago, Ill.

Application October 22, 1947, Serial No. 781,380

7 Claims. (Cl. 56—400.18)

My present invention relates to an improvement in rakes and like devices.

My invention is particularly adaptable for use in sweep rakes for cleaning lawns and the like of leaves and other debris, in which the rake is adapted to be used with a sweeping motion i. e. reciprocated transversely forwardly of the user as distinguished from the conventional raking operation in which the device is positioned forwardly of the person and then drawn along the ground toward the person.

It is an object of my invention to provide a rake or the like of the character described provided with prong means adapted to gather leaves or other debris in windrows by a sweeping motion of the rake.

In order to achieve the aforesaid object, I propose to provide a prong means having a plurality of prongs and in which certain of the prongs are bent at their free ends to extend in one direction and with other of the prongs having their free ends bent in the opposite direction so that the prong means by being manipulated with a sweeping motion is operative in both directions of movement to gather leaves and other debris in spaced windrows.

It is a further object of my invention to provide a rake or the like adapted to be manipulated with a sweeping motion comprising sweeping means and handle means to one end of which the sweeping means is secured, and with the handle means being disposed angularly to the sweeping means so that when held by the user with the sweeping means disposed forwardly in position for use the handle angles downwardly outwardly forwardly of the user. The purpose of such arrangement of the handle and sweeping means is to provide for disposition of the sweeping means forwardly of the user in a position where the latter is conveniently disposed to be manipulated with a sweeping motion. Such sweeping means may vary widely in form in accordance with my present invention and several forms thereof suitable for use in a sweep rake are hereinafter disclosed in detail.

In arranging the parts of the rake or other like device in the manner last described the handle and prong means of the rake or, for example, the handle and fiber sweeping member of a broom, in effect form a crank with the result of that the handle means tends to rotate about its longitudinal axis in the hands of the user. It is a further object of my invention to avoid this disadvantage, and in order to accomplish such object I propose to embody in a rake or the like a first hand grip means associated with the handle means which may be held at right angles to the axis of the handle means providing a lever which when grasped in one hand may be used conveniently to prevent the tendency of the handle means to rotate about its axis.

A further object of my invention is to provide a handle means for a rake or broom or the like having means to compensate for the effective shortening and lengthening of the handle means when the device is used with a sweeping motion as aforesaid. The latter object may be accomplished in accordance with my invention in a variety of ways with the preferred means of so doing comprising forming the handle means of a pair of telescopic members movable relative to each other when the device is being used with a sweeping motion to provide for automatically varying the effective length of the handle means.

A still further object of my invention is to provide a second hand grip means disposed intermediate the ends of the handle means and which together with the first grip means above mentioned provides for the convenient manipulation of the rake by the user.

The second grip means preferably is of a character which may be movable freely axially of the handle means and also rotatably about the axis of the latter to permit easy manipulation of the rake or other device. In the preferred form of my invention one of the two handle grip means may be grasped in one hand to prevent rotative movement of the handle means about its axis, and the second hand grip means may be grasped in the other hand for conveniently guiding the rake or other device in the sweeping movement of the latter without undue strain on the user even in the handling of heavy loads.

It is a further object of my invention to provide a plurality of set screw means associated with the telescopic members of the handle means, and with the intermediate or second hand grip means for selectively providing for relative movement between the parts of the rake as desired and as will be described in detail hereinafter.

Other objects, and advantages of my invention will appear from the detail description.

Now in order to acquaint those skilled in the art with the manner of construction and utilizing rakes and like devices in accordance with my present invention, I shall describe in connection with the accompanying drawings certain preferred embodiments of my invention.

In the drawings:

Figure 1 is a side elevational view of a preferred form of rake constructed in accordance with my invention;

Figure 2 is a detail substantially horizontal sectional view taken substantially on the line 2—2 of Figure 1 looking in the direction indicated by the arrow;

Figure 3 is a detail substantially vertical sectional view with certain parts being shown in elevation through the intermediate hand grip means of the rake of Figure 1;

Figure 4 is a side elevational view of a portion of the lower end of the rake showing the manner in which the handle means is attached to the prong means of the rake of Figure 1;

Figure 5 is a front elevational view of a modified form of hand grip means for the upper end of a handle means for rake or the like;

Figure 6 is a side elevational view of the upper hand grip means shown in Figure 5;

Figure 7 is a detail sectional view along the lines of the view of Figure 3 and showing a modified form of intermediate hand grip means for a rake or other device of the character described;

Figure 8 is a side elevational view of a modified form of prong means for a rake such as shown in Figure 1;

Figure 9 is a detail perspective view of the outer ends of a plurality of prongs, providing a construction suitable for use in the rake of Figure 1;

Figure 10 is a partial perspective view of another form of prong means for the rake of my present invention;

Figure 11 is a partial perspective view of still another form of prong means for a rake of my present invention; and Figure 12 is a partial perspective view of still another form of prong means having utility for use in a rake of the type shown in Figure 1 of the drawings.

Referring now to Figure 1 of the drawings I have shown a rake constructed in accordance with my invention comprising a handle means indicated generally at 14, a prong means indicated generally at 15 and secured to the lower end of the handle means 14, a first hand grip means indicated generally at 16, and disposed at the upper end of the handle means 12, and a second hand grip means 17 disposed intermediate the ends of the handle means 14.

In the form of the rake shown in Figure 1 the handle means 14 comprises a pair of tubular upper and lower telescopic members 18 and 19 which are formed, respectively, with an axially extending ridge 20 having sliding engagement in a conformably formed groove 22 substantially of U-shape in cross-section as shown in Figure 2 which provides for relative axial movement of the members 18 and 19 with respect to each other but prevents relative rotative movement of the members 18 and 19 with respect to each other. A set screw shown at 23 has threaded engagement in a boss 24 welded to the outer periphery of the outer tubular member 19 adjacent the upper end thereof. The set screw 23 is adapted when threaded inwardly to bear against the inner tubular member 18 so that if desired the members 18 and 19 may be secured together to prevent relative axial movement therebetween.

The prong means 15 shown in Figure 1 is of a character adapted for the gathering of leaves or other debris collecting on a lawn or the like, but it will be understood that in the broader aspects of my invention that the prong means 15 may comprise any suitable form of sweeping means such as fibrous members or the like in the nature of a broom as distinguished from the sheet metal prong means shown in the drawings. The prong means 15 as shown more clearly in Figures 1 and 4 comprises a resilient sheet metal member 25 having a plurality of prongs 26 with the sheet metal member 25 being adapted to be secured between a pair of transversely extending frame members 27 formed with longitudinally extending curled upper and lower edges with the pair of upper curled edges 28 of the members 27 being disposed between the conformably curved ends 29—29 of a pair of bracket members 30—30. The bracket members 30—30 are secured to plate portion 32 of an end cap member 33 by means of set screw means 34. The set screw means 34 provides for adjustment of the cap member 33 lengthwise of the prong means 15 and for adjusting the angular position of the handle means 14 with respect to the prong means 15. The cap member 33 as shown receives the outer lower end of the outer tubular member 19 with the member 19 being secured therein as by a transversely extending pin 36.

The first hand grip means 16 above referred to is suitably disposed at the upper end of the inner telescopic member 18 and comprises a tubular hand grip member 40 formed at its outer end with enlarged end flanges 42—42. The hand grip member 40 is mounted for axial movement in a T fitting 43 fixed to the upper outer end of the inner telescopic member 18 as by a bolt 44. The rake is arranged so that the handle means 14 normally is disposed so as to extend angularly downwardly forwardly of the person with the showing in Figure 1 illustrating the rake as it appears from the side. With this arrangement of parts the handle means 14 when reciprocated transversely forwardly of the person is caused by engagement of the prong means with the ground to be rotated about its longitudinal axis. In order to prevent such rotation of handle means 14 with the handle grip member 14 is disposed in the position shown in Figure 1 and when grasped in one hand provides a lever extending at right angles to the axis of the handle means 14 for conveniently and easily preventing such rotative movement of the handle means 14 about its axis. As indicated in dotted lines in Figure 1 the hand grip member 40 may be shifted to the dotted line position shown in the drawings and which together with the adjustment provided by the screw means 34 permits changing the angularity of the handle means 14 with respect to the prong means 15 and for the disposal of the hand grip member 40 in a position convenient for either left and right handed persons. The intermediate hand grip means 17 as shown in Figures 1 and 3 comprises a bushing 50 having annular flange 51 at at its upper end and which bushing is mounted for movement both axially and rotatively about the outer tubular member 19 of the handle means 14. A collar 52 is disposed about the bushing 51 between the annular flange 51 and is retained by a ring member 53 threaded on the lower end of the bushings 51, and which ring member 53 is adapted to be secured in position by set screw 54 having threaded engagement with the sleeve portion of the bushing 50. The inner end of set screw 54 is also adapted to bear against the outer surface of the outer telescopic member 19 for preventing, if desired, relative axial and rotatable movement of the bushing 50 with respect to the handle member 19. A hand grip member 55 has a set screw 56 pivotally mounted therein as about a bolt 57 with the handle 55 being adapted to rotate the screw 56 to cause the inner end of the same to bear against the periphery of the collar 52 with respect to the bushing 50. The bolt 57 has a wing nut threaded therein which may be drawn tight to prevent pivotal movement of the hand grip means 55 about the bolt means 57 or which may be made relatively loose to provide for pivotal movement of the hand grip member 55 in the path indicated by the dotted lines in Figures 1 and 3. Assuming that the hand grip means 17 is arranged with the set screws 54 and 57 loosened and the set screw 23 tightened it will be observed that upon the grasping of the hand grip member 55 in one hand and the hand grip member 40 of the first hand grip means 16 in the other hand that the rake may be used with a sweeping motion as previously described with the bushing 50 and the collar 52 being movable axially of handle means 14 to take care of the effective lengthening and shortening of the handle means in the aforesaid sweeping motion of the rake. Also relative rotation of collar 52 about bushing 50 and of the bushing 51 with respect of the outer tubular member 19 permits free rotatable movement of the hand grip means 17 about the tubular portion 19 enabling the convenient manipulation of the rake. It will be observed that the set screw 54 when engaged with the outer tubular member 19 prevents the relative axial shifting movement of the hand grip means 17 with respect of the outer tubular member 19, and in such instances it is preferable that the set screw 23 between the outer and inner tubular members be released so that the effective lengthening and shortening of the handle means 14 is accommodated by the relative telescopic axial movement of the members 18 and 19 with respect to each other. However, if the set screw 23 is tightened to prevent the relative axial movement between the members 18 and 19 then it is preferred that set screw 54 be released to provide for operation of the rake in the manner aforesaid by permitting relative axial movement of the bushing 50 with respect of the outer tubular member 19.

In Figures 5 and 6 I have shown a modified form of hand grip means 16' for the upper end of handle means 14 for a rake such as with a tubular member 18' adapted to have telescopic engagement with a second tubular member such as the member 19 shown in Figure 1. In the form of the invention shown in Figures 5 and 6 a thin resilient steel strap 60 is fixed at one end within a flattened portion 62 of the tubular member 18' and at its other end it is secured within a flattened end 63 of a hand grip member 64 with the opposite ends of the steel spring member 60 being secured to the flattened portions 62 and 63 of the member 18' and 64 as by a plurality of rivets shown at 65. In this form of the invention the hand grip member 65 normally extends lengthwise of the handle member 18' but the spring member 60 is sufficiently resilient so that the hand grip member 64 may be disposed and easily held at right angles to the axis of shaft portion 18'. The hand grip member 64 when disposed in the latter position has the same function as that already described in connection with the hand grip member 40 of the first hand grip means 16 above described.

Referring now to Figure 7 I have shown a modified form of a second or intermediate hand grip means 17' with the parts of this modification which are the same as the modification described in connection with Figures 1 and 3 bearing the same reference numerals. In this form of intermediate hand grip means the hand grip member 55' is provided with a cup shaped portion 66 having universal connection with the substantially spherical head 67 of a set screw 68, and with a set screw 69 being provided for clamping the cup shaped portion 66 to the head 67 to prevent, if desired, universal movement between the hand grip member 55' and the set screw 68. In this form of the invention the hand grip member 55' with the set screw 69 released provide for substantial universal movement of handle 55' with respect of the set screw 68 and when the set screw 69 is in tightened position rotation of the hand grip member 55' is adapted to effect engagement of the set screw 68 with the bushing 50 to prevent rotative movement of the collar 52 with respect of the bushing 50 in the manner already described.

In Figure 8 I have shown a modified form of prong means 15' in which the several prongs 70 extend angularly inwardly toward each other and are secured as previously described between a pair of appropriately formed plate members 27' having upper and lower curled edges 28' and with the bracket means comprising a pair of clamping plates 29' as previously described, adapted to have clamping engagement with the upper curled edges 28'. As before a set screw 34' is provided for attaching plate 32' of end cap member 33' to the clamp plates 29' and to provide for pivotal adjustment of the lower shaft portion 19' of a handle means 14' to the prong assembly.

Referring now to Figures 9 through 12 I have shown several forms of prong means having utility in a sweep rake of the type above described.

In Figure 9 I have shown a prong means 72 comprising a plurality of individual prongs 73 of thin spring sheet metal in which each of the prongs 73 is split longitudinally and substantially centrally of the outer ends thereof to provide each with a pair of fingers 75—75. The ends 75 of each of the prongs are rounded and bent in opposite directions so that when they are assembled at their opposite ends in a prong supporting structure such as shown generally at 15 in Figure 1 the free ends of prongs extend in opposite directions with the result that when the rake is moved with a sweeping motion leaves and other debris is gathered in spaced lengthwise extending windrows at the limits of the sweeping stroke in opposite directions.

As shown in Figure 10 instead of the prongs being slit at their outer ends an arrangement may be provided in which a plurality of prongs 77 are arranged so that alternate prongs extend in opposite directions to provide for a raking action in both directions of movement of the rake forwardly transversely of the person. In this form of the invention the prongs are of tapering formation so that the free ends are flexibly and are adapted to yieldingly engage the ground.

In Figure 11 of the drawings I have shown another embodiment of a prong means for use in the rake of my present invention in which the serveral prongs 78 are provided with a pair of slits at their outer free ends to provide three fingers 79, 80 and 81 for each prong member 78. In the arrangement of the prong means shown in this figure a pair of each three fingers of each prong is bent in the same direction, and with the other of the three fingers being bent in the opposite direction. Also in adjacent prongs the fingers are oppositely arranged to provide the same number of prongs extending in each direction when a rake is composed of a plurality of such prongs.

In the embodiment of the prong means shown in Figure 12 the several prongs 85 as in the prong means of Figure 11 are provided with a pair of slits at their outer free ends, but in this arrangement one of the outer fingers extends in one direction, the other outer finger extends in the opposite direction and the intermediate finger lies in the plane of the sheet spring steel member for which the prong is formed. In this form of rake as in the previously described rakes the prong means is effective to sweep in both directions of a sweeping motion.

While I have shown and described what I consider to be the preferred embodiments of my invention it will be readily understood that various modifications and rearrangements may be made therein without departing from the spirit and scope of my invention.

I claim:

1. In a rake or the like adapted to be used with sweeping motion by reciprocating the same transversely forwardly of the person comprising, telescopic handle means, sweeping means at one end of said handle means, said handle means and said sweeping means being arranged so that said handle means extends angularly upwardly and outwardly from said sweeping means toward the person, the longitudinal axis of said handle means lying within a plane defined by said sweeping means, and hand grip means at the other end of said handle means and in transverse disposition therewith to prevent rotative movement of the latter about its axis when said rake is used with a sweeping motion.

2. In a rake or the like adapted to be used with a sweeping motion by reciprocating the same transversely forwardly of the person comprising, telescopic handle means, sweeping means at one end of said handle means, said handle means and said sweeping means being arranged so that said handle means extends angularly upwardly and outwardly from said sweeping means toward the person, said handle's longitudinal axis lying within a plane defined by said sweeping means; a first hand grip means at the other end of said handle means, and a second hand grip means intermediate the ends of said handle means, disposed transversely thereof and angularly adjustable relative thereto.

3. In a rake or the like adapted to be used with a sweeping motion by reciprocating the same transversely forwardly of the person comprising, telescopic handle means, sweeping means at one end of said handle means, said handle means and said sweeping means being arranged so that said handle means extends angularly upwardly and outwardly from said sweeping means toward the person, said handle's longitudinal axis lying within a plane defined by said sweeping means; a first hand grip means at the other end of said handle means and disposed transversely thereof to prevent rotation of said handle means about its axis when said rake or the like is used with a sweeping motion, and a second hand grip means intermediate the ends of said handle means movable axially of the latter in the sweeping motion of the rake or the like, disposed transversely thereof and angularly adjustable relative thereto.

4. Prong means for a rake, comprising a plurality of resilient prongs arranged in side by side relation having their upper ends integrally interconnected whereby said prongs all lie substantially within a single plane, each of said prongs having lower ground-engaging, finger members of equal length, certain ones of which are bent in one direction out of said plane and others of which are bent in an opposite direction out of said plane.

5. Prong means for a rake comprising a plurality of spring prong members, commonly interconnected at their upper ends in side-by-side, in-line relation, whereby said prongs lie in a single plane common to all of said prongs, resilient equal length, finger members integrally formed from the lower ends of said prongs, certain of which fingers are bent angularly in one direction out of said prongs' common plane and others of which are bent angularly in an opposite direction out of said common plane whereby no two of said fingers lie within the same plane which is transversely disposed with respect to said first mentioned plane.

6. Prong means for use in a sweep type rake adapted for lateral arcuate motion for alternately sweeping refuse to either end of its arcuate swing, comprising in combination, a plurality of resilient prong members formed of relatively flat metal strips, having greater width than thickness; said prongs being arranged in side-by-side, in line relation and having their lateral edges, as defined by said metal's thickness, being in side-by-side, spaced relation so that said prongs lie substantially within a single common plane, a plurality of resilient, ground-engaging fingers formed integrally from and at the lower end of each of said prongs, each of said fingers having greater width than thickness and being bent in angular relation to one side of said prongs' common plane, some in one direction and others in an opposite direction whereby no two of said fingers contain points lying within a common plane which is disposed transversely with respect to said prongs' common plane.

7. Prong means for use with a rake of the class described, comprising in combination, a plurality of resilient prong members commonly interconnected at their upper ends so as to lie in side-by-side relation to define a single plane common to all of said prongs, said prongs each having greater width than thickness, a plurality of ground-engaging, finger members formed integrally from and at the lower end of said prongs, some of which fingers are bent angularly out of said prongs' common plane, to one side thereof, and others of which are similarly bent out of said common plane, but in an opposite direction; said fingers lying wholly within the lateral limits as defined by said width of said prongs.

HOMER T. JENKINS.

REFERENCES CITED

The following references are of record in the file of this patent:

UNITED STATES PATENTS

| Number | Name | Date |
|---|---|---|
| 210,356 | Quinlan | Nov. 26, 1878 |
| 524,215 | Quigley | Aug. 7, 1894 |
| 1,356,972 | Crisman | Oct. 26, 1920 |
| 2,105,161 | Platt | Jan. 11, 1938 |
| 2,110,538 | Walsh | Mar. 8, 1938 |
| 2,252,126 | Kersey | Aug. 12, 1941 |
| 2,355,840 | Ales | Aug. 15, 1944 |

FOREIGN PATENTS

| Number | Country | Date |
|---|---|---|
| 404,722 | France | Dec. 10, 1909 |